United States Patent
Husted et al.

(10) Patent No.: US 9,871,968 B2
(45) Date of Patent: Jan. 16, 2018

(54) IMAGING SYSTEM FOR GENERATING A SURROUND-VIEW IMAGE

(71) Applicant: Caterpillar Inc., Peoria, IL (US)

(72) Inventors: Douglas Jay Husted, Secor, IL (US); Peter Joseph Petrany, Dunlap, IL (US); Simon Richard Conway, Royal Leamington Spa (GB)

(73) Assignee: Caterpillar Inc., Peoria, IL (US)

( * ) Notice: Subject to any disclaimer, the term of this patent is extended or adjusted under 35 U.S.C. 154(b) by 270 days.

(21) Appl. No.: 14/719,766

(22) Filed: May 22, 2015

(65) Prior Publication Data

US 2016/0344931 A1    Nov. 24, 2016

(51) Int. Cl.
| | |
|---|---|
| *H04N 7/18* | (2006.01) |
| *H04N 5/232* | (2006.01) |
| *E02F 9/26* | (2006.01) |
| *G06T 7/73* | (2017.01) |
| *H04N 5/247* | (2006.01) |

(52) U.S. Cl.
CPC ......... *H04N 5/23238* (2013.01); *E02F 9/261* (2013.01); *G06T 7/74* (2017.01); *H04N 5/247* (2013.01); *H04N 7/181* (2013.01); *G06T 2207/20221* (2013.01); *G06T 2207/30252* (2013.01)

(58) Field of Classification Search
CPC .... H04N 5/23238; H04N 5/247; H04N 7/181; G06T 7/74; G06T 2207/30252; G06T 2207/20221; E02F 9/261

USPC .......................................................... 348/148
See application file for complete search history.

(56) References Cited

U.S. PATENT DOCUMENTS

| | | |
|---|---|---|
| 2010/0289899 A1 | 11/2010 | Hendron et al. |
| 2012/0062706 A1 | 3/2012 | Keshavmurthy et al. |
| 2012/0236142 A1 | 9/2012 | Enix |
| 2013/0088593 A1 | 4/2013 | Ishimoto |
| 2013/0304331 A1 | 11/2013 | Braunstein et al. |
| 2016/0217331 A1* | 7/2016 | Kowatari ................ E02F 9/261 |
| 2016/0251836 A1* | 9/2016 | Baba ...................... E02F 3/435 |
| | | 701/50 |

* cited by examiner

*Primary Examiner* — Allen Wong
(74) *Attorney, Agent, or Firm* — Finnegan, Henderson, Farabow, Garrett & Dunner, LLP

(57) ABSTRACT

An imaging system for a machine having an implement includes at least two cameras mounted on the machine at opposing sides of the implement and configured to generate at least two camera views of an environment of the machine, and a processing device in communication with the at least two cameras. The processing device is configured to obtain the at least two camera views, obtain at least one of a position or an angle of the implement, determine at least one of a position or an angle of a stitching line according to the at least one of the position or the angle of the implement, and generate a stitched surround view based on the at least two camera views and the stitching line.

20 Claims, 4 Drawing Sheets

IMAGING SYSTEM FOR GENERATING A SURROUND-VIEW IMAGE

TECHNICAL FIELD

The present disclosure relates to an imaging system and, more particularly, to an imaging system for generating a surround-view image.

BACKGROUND

Excavation machines such as backhoe loaders, haul trucks, wheel loaders, scrapers, and other types of heavy equipment, are used to perform a variety of tasks. Some of these tasks involve carrying large, awkward, loose, and/or heavy loads along rough and crowded roadways. And because of the size of the machines and/or poor visibility provided to operators of the machines, these tasks can be difficult to complete effectively. For this reason, some machines are equipped with imaging systems that provide views of a machine's environment to the operator.

Conventional imaging systems include one or more cameras that capture different sections of the machine's environment. These sections are then stitched together to form a partial or complete surround view.

U.S. Patent Application Publication No. 2012/0236142 of Enix et al., which published on Sep. 20, 2012 (the '142 publication), discloses an imaging system having a plurality of video cameras mounted in a row on a camera support. The cameras capture images of an environment of the machine and have overlapping fields of view. A processor is responsive to the cameras for determining the relative position of a point of interest on a surface in the overlapping fields of view of at least two adjacent cameras.

Although the system of the '142 publication may be acceptable for some applications, the system may still be less than optimal. For example, certain machines may be equipped with an implement, such as a movable arm, that blocks the view of one or more of the cameras. In this scenario, with a conventional imaging system, such as the one in the '142 publication, an operator of the machine will not be able to see the portion of the environment that is blocked by the implement.

The disclosed system is directed to overcoming one or more of the problems set forth above and/or other problems of the prior art.

SUMMARY

In one aspect, the present disclosure is directed to an imaging system for a machine having an implement. The imaging system includes at least two cameras mounted on the machine at opposing sides of the implement and configured to generate at least two camera views of an environment of the machine, and a processing device in communication with the at least two cameras. The processing device is configured to obtain the at least two camera views, obtain at least one of a position or an angle of the implement, determine at least one of a position or an angle of a stitching line according to the at least one of the position or the angle of the implement, and generate a stitched surround view based on the at least two camera views and the stitching line.

In another aspect, the present disclosure is directed to a method for displaying an environment around a machine having an implement. The method includes obtaining at least two camera views from opposing sides of the implement, obtaining at least one of a position or an angle of the implement, determining at least one of a position or an angle of a stitching line according to the at least one of the position or the angle of the implement, and generating a stitched surround view based on the at least two camera views and the stitching line.

In yet another aspect, the present disclosure is directed to a non-transitory computer-readable storage medium storing instructions. The instructions, when executed by a processing device of a machine having an implement, cause the processing device to obtain at least two camera views from opposing sides of the implement, obtain at least one of a position or an angle of the implement, determine at least one of a position or an angle of a stitching line according to the at least one of the position or the angle of the implement, and generate a stitched surround view based on the at least two camera views and the stitching line.

DETAILED DESCRIPTION

Figure 1:
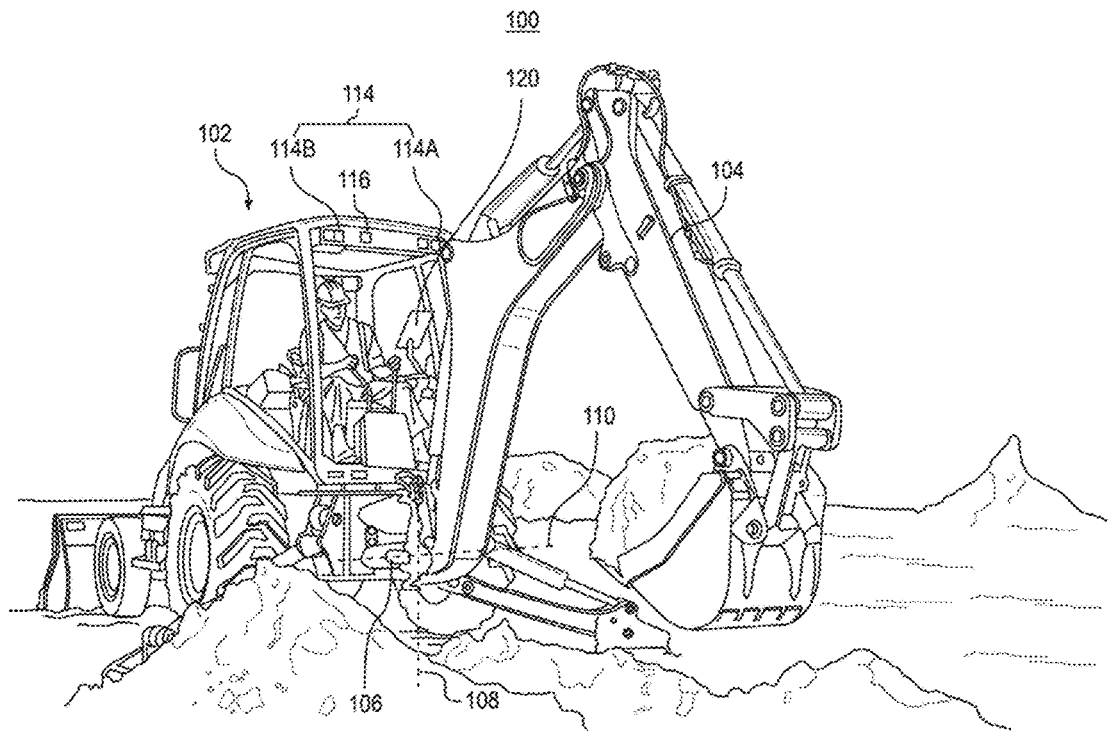
FIG. 1 is a pictorial illustration of an exemplary disclosed machine having an implement.

FIG. 1 illustrates an exemplary machine 100 consistent with embodiments of the present disclosure. As shown in FIG. 1, machine 100 is a backhoe loader. It is contemplated, however, that machine 100 may embody other types of mobile machines, if desired, such as an excavator, a skid steer loader, a hydraulic shovel, or any other machine known in the art.

In some embodiments, as shown in FIG. 1, machine 100 includes a main body 102 and an implement 104. The implement 104 may be a loading bucket (shown in FIG. 1), a breaker, a grapple, an auger, or a stump grinder, configured to complete its assigned tasks such as digging or shoveling. Machine 100 further includes an articulation joint system 106 operatively connecting implement 104 to main body 102. The term "articulation joint system" may include an assembly of components that cooperate to pivotally connect implement 104 to main body 102, so that implement 104 may pivot with respect to main body 102 about at least one of a vertical axis 108 or a horizontal axis 110. Vertical axis 108 may be perpendicular to a work surface under machine 100, and horizontal axis 110 may be parallel to the work surface. One skilled in the art may appreciate that the relative movement of implement 104 with respect to main body 102 may exist in any manner.

Figure 2:
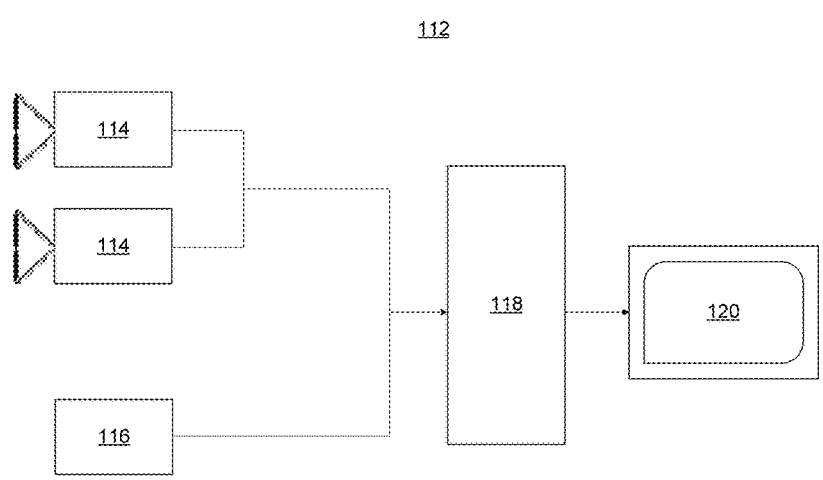
FIG. 2 is a diagrammatic illustration of an exemplary disclosed imaging system that may be used in conjunction with the machine of FIG. 1.

Machine 100 also includes an imaging system 112 that may include one or more of the following components: a plurality of cameras 114, at least one sensor 116, a processing device 118, and a display device 120. Imaging system 112 may be configured to capture and process data, such as image data and/or object data, associated with an actual environment of machine 100 and/or of a portion of machine 100. FIG. 2 is a diagrammatic illustration of imaging system 112 showing the coupling between different components of imaging system 112. As illustrated in FIG. 2, cameras 114 and sensor 116 are coupled to processing device 118, which is in turn coupled to display device 120. While FIG. 2 shows the components of imaging system 112 as separate blocks, those skilled in the art will appreciate that the functionality described below with respect to one component may be performed by another component, or that the functionality of one component may be performed by two or more components.

In some embodiments, as shown in FIG. 1, display device 120 is mounted on main body 102. The term "display device" refers to one or more devices used to present an output of processing device 118 to the operator of machine 100. Display device 120 may include an LCD display device, and may be a single-screen display or a multi-screen display. Display device 120 may include multiple displays managed as separate logical displays. Thus, different contents can be displayed on the separate displays, although part of the same physical screen. Consistent with the present disclosure, display device 120 may be used to display a representation of the environment around machine 100 based on image data captured by cameras 114. In addition, display device 120 may include a touch sensitive screen. Thus, display device 120 may have the capability to input data and to record information.

Cameras 114 are configured to capture image data including camera views (also referred to as "camera images"). Each of the camera views corresponds to a section of an environment around machine 100. The term "camera" generally refers to a device configured to capture and record image data, for example, still images, video streams, time lapse sequences, etc. Cameras 114 can be, for example, color cameras, monochrome cameras, high-resolution cameras, or any suitable cameras. Cameras 114 capture image data and transfer the captured image data to processing device 118 for processing. Each camera 114 has a view angle, which may be, for example, an angle in the range from about 0° to about 180°, or may be an angle larger than 180°. In some embodiments, cameras 114 together capture a complete surround view of the environment of machine 100, so that an operator of machine 100 can have a 360-degree horizontal view of the environment.

Cameras 114 may be mounted on or attached to machine 100, as needed. In some embodiments, as shown in FIG. 1, two cameras 114 are mounted on main body 102, including a first camera 114A arranged to the left side of implement 104 (first camera 114A is also referred to as "left camera 114A") and a second camera 114B arranged to the right side of implement 104 (second camera 114B is also referred to as "right camera 114B"). The relative positions of left and right cameras 114A and 114B with respect to implement 104 can be more clearly seen in the plan view of machine 100 shown in FIG. 3.

Figure 3:
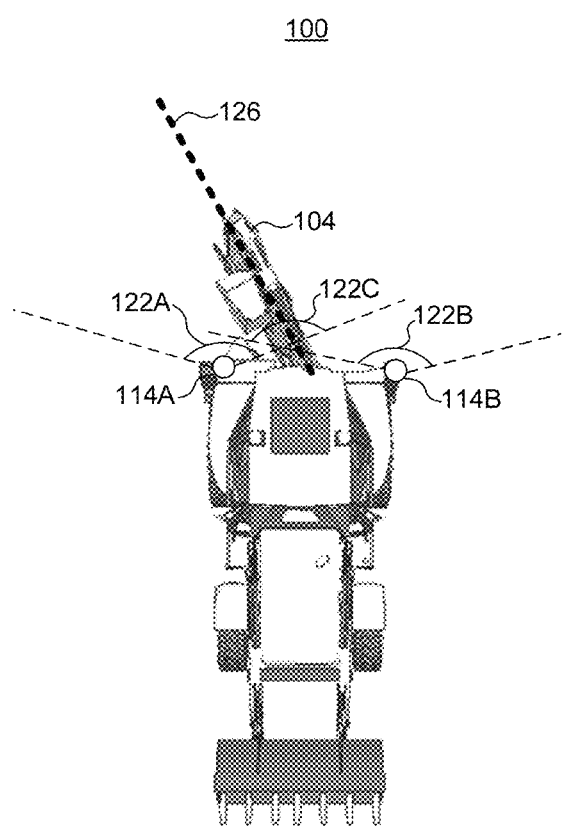
FIG. 3 is a plan pictorial view of the machine of FIG. 1.

As shown in FIG. 3, left and right cameras 114A and 114B have corresponding camera views 122A and 122B, which have an overlapping portion 122C covering a same section of the environment. In some embodiments, overlapping portion 122C covers an entire span of the movement of implement 104. That is, implement 104 is always in overlapping portion 122C, while pivoting and is, thus, always in the camera view captured by each of left and right cameras 114A and 114B.

In some embodiments, in addition to or instead of left camera 114A and right camera 114B, machine 100 may also have cameras 114 arranged above and below implement 104, or cameras 114 arranged at other portions of machine 100. One skilled in the art will appreciate that machine 100 may include any number of cameras 114 arranged in any manner, as long as at least two cameras 114 are arranged at different sides of implement 104.

Positions and/or pointing directions (also referred to as "orientations") of cameras 114 may be set as needed, for example, to capture images of area(s) of interest. For example, as shown in FIG. 1, left camera 114A and right camera 114B may be arranged on a same horizontal plane. Alternatively, left camera 114A and right camera 114B may be arranged on different horizontal planes. Further, left camera 114A and right camera 114B may point at a same direction, i.e., their optical axes are parallel to each other. Alternatively, left camera 114A and right camera 114B may point at different directions, i.e., their optical axes are not parallel to each other. In some embodiments, cameras 114 may be arranged and configured so that at least two of them have overlapping fields of view. In some embodiments, positions and pointing directions of different cameras 114 are pre-configured and recorded, and can be used by processing device 118 when processing camera views captured by cameras 114.

Sensor 116 may be configured to generate data associated with implement 104, such as the position or the angle of implement 104, measured for example during operation of machine 100. The angle of implement 104 may refer to an angle between a vertical plane on which implement 104 lies and a moving direction in which machine 100 can move. The term "sensor" may include any type of sensor or sensor group configured to measure one or more parameter values indicative of, either directly or indirectly, the position or the angle of implement 104. For example, sensor 116 may include a rotational sensor mounted in or near implement 104 for measuring the angle of implement 104, or may include an infrared sensor or an ultrasonic sensor that can detect the position and/or angle of implement 104 by detecting a relative position of implement 104 with respect to the sensor, such as measuring a distance between the sensor and a specific part of implement 104. Alternatively, sensor 110 may determine the position and/or the angle based on control data from a control device (not shown) of machine 100 or data fed back from articulation joint system 106. One skilled in the art will appreciate that machine 100 may include any number and type of sensors to measure various parameters associated with machine 100. Consistent with embodiments of the present disclosure, processing device 118 may be configured to perform various operations, such as an image stitching process to combine the image data captured by cameras 114 and to generate a stitched surround view of the environment around machine 100. The term "processing device" may include any physical device having an electric circuit that performs a logic operation on input. For example, processing device 118 may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations.

In some embodiments, as shown in FIG. 2, imaging system 112 further includes a storage medium 124. The storage medium 124 may be a non-transitory computer-readable storage medium, such as a memory device (e.g., random access, flash memory, or the like), an optical medium (e.g., a CD, DVD, BluRay®, or the like), firmware (e.g., an EPROM), or any other storage medium. Storage medium 124 may store data captured by cameras 114 and/or sensor 116. Storage medium 124 may also store a computer program containing instructions for execution by processing device 118 to cause imaging system 112 to perform particular operations, such as operations consistent with embodiments of the present disclosure to stitch camera views.

In some embodiments, instead of or in addition to storage medium storing the above-described computer program, imaging system 112 may also include hardware modules comprised of connected logic units, such as gates and flip-flops, and/or comprised of programmable units, such as programmable gate arrays or processors, for example, each of which is configured to perform part or all of the operations consistent with embodiments of the present disclosure.

According to the present disclosure, processing device 118 stitches the camera views from cameras 114 together at a stitching line to create a stitched surround view of the actual environment of machine 100. In some embodiments, processing device 118 may cut out, from the camera view of each camera 114, a portion on one side of the stitching line that is farther away from the other camera 114, and then join the cut-out portions together to form the stitched surround view. For example, as shown in FIG. 3, a stitching line 126 is arranged to coincide with implement 104. After receiving camera views 122A and 122B from left camera 114A and right camera 114B, respectively, processing device 118 cuts out a portion of camera view 122A that is on the left of stitching line 126 and a portion of camera view 122B that is on the right of stitching line 126, and stitches these two portions together to create the stitched surround view.

In some embodiments, processing device 118 does not cut camera views 122A and 122B exactly at stitching line 126. Rather, the cut-out portions of camera views 122A and 122B may each include an overlapping region around stitching line 126 and a non-overlapping region on one side of stitching line 126. Each overlapping region has a predetermined width smaller than a width of overlapping portion 122C. These overlapping regions contain the same section of the environment and may also be referred to as stitching areas. When performing the stitching process, processing device 118 superimposes the stitching area of the cut-out portion from camera view 122A and the stitching area of the cut-out portion from camera view 122B. In some embodiments, before performing the superimposition, the processing device 118 may reduce image intensities in the stitching areas of the cut-out portions, so that the image intensity in the stitching area (also referred to as a "superimposed portion") of the stitched surround view is about the same as the image intensity in other portions of the stitched surround view. For example, the processing device 118 may reduce the image intensities in the stitching areas of the cut-out portions by half.

The stitched surround view can be a broad view having a viewing angle larger than that of a single camera 104. In some embodiments, the stitched surround view may be a 360-degree view of the actual environment of machine 100. Based on the position or angle of implement 104, processing device 118 may determine a location of a stitching line between two camera views from two neighboring cameras 114, such as left camera 114A and right camera 114B, so that captured images of implement 104, which would otherwise be seen in at least one of the camera views of the two neighboring cameras 114, are not shown in the stitched surround view.

For a machine that does not have an implement, a line positioned at any place in an overlapping portion of the camera views of two neighboring cameras may serve as the stitching line for stitching the camera views. In such a scenario, a stitching line at a fixed position or a fixed angle could be used. However, for machine 100 that has implement 104 as shown in FIGS. 1 and 3, if the stitching line is fixed at a certain position or a certain angle, then when implement 104 does not coincide with the stitching line, implement 104 may still appear in the stitched surround view and thus block a portion of the environment. As a result, the operator of machine 100 may not be able to see the section of the environment that is behind implement 104. On the other hand, if the stitching line coincides with implement 104, implement 104 may disappear from the stitched surround view, and thus the operator can see the environment without obstruction.

Figure 4A:
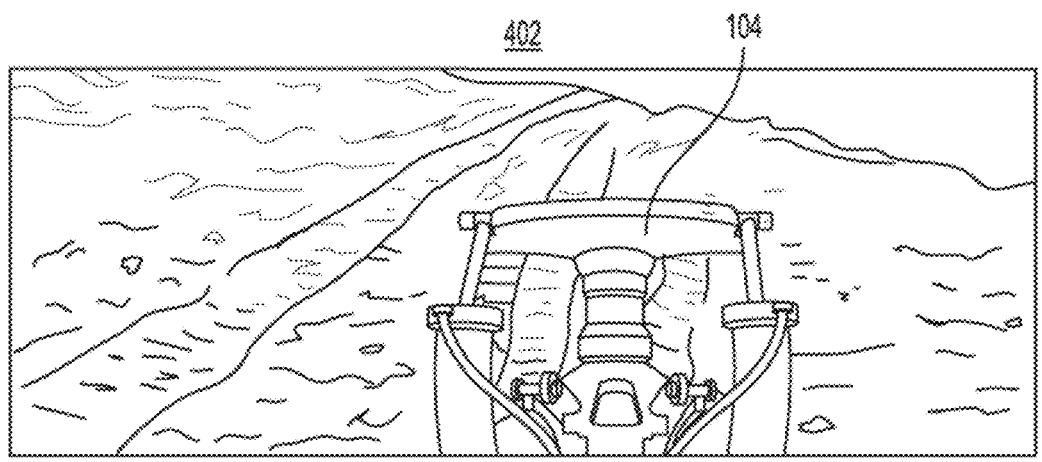
FIGS. 4A-4C are exemplary stitched surround views created under different conditions.
Figure 4B:
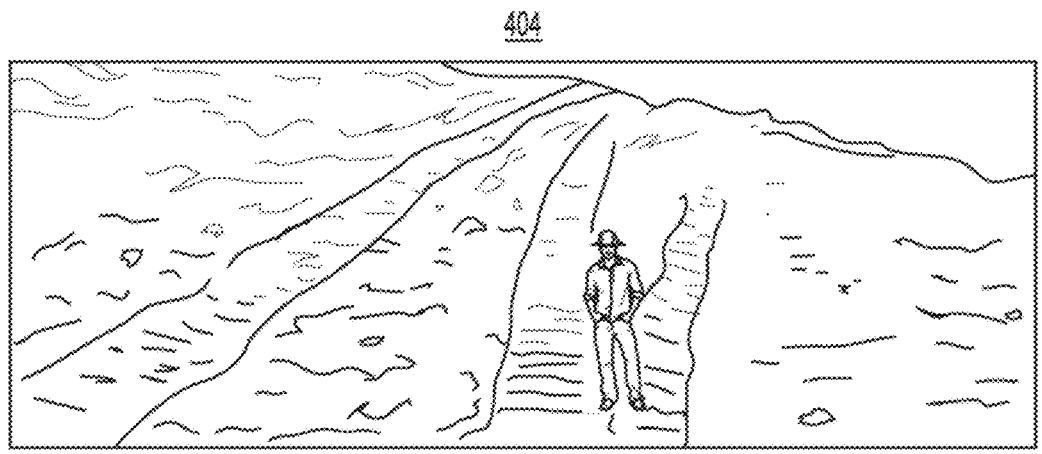

FIGS. 4A and 4B schematically illustrate a stitched surround view 402 created using a stitching line that does not coincide with implement 104 (FIG. 4A), and a stitched surround view 404 created using a stitching line that coincides with implement 104 (FIG. 4B). In stitched surround view 404, a person behind implement 104 can be seen, who is obstructed by implement 104 in stitched surround view 402.

Therefore, according to the present disclosure, processing device 118 dynamically updates the position and/or angle of the stitching line according to the position and/or angle of implement 104. In some embodiments, as shown in FIG. 3, processing device 118 dynamically positions stitching line 126 so that stitching line 126 remains coincident with implement 104 as implement 104 moves or rotates.

In order to dynamically update the position and/or angle of stitching line 126, processing device 118 may dynamically determine the position and/or angle of implement 104. In some embodiments, processing device 118 determines the position and/or angle of implement 104 by analyzing camera views 122A and 122B captured by left and right cameras 114A and 114B. Various approaches can be employed to analyze camera views 122A and 122B to determine the position and/or angle of implement 104. For example, processing device 118 may determine the position and/or angle of implement 104 using a pattern recognition technique to recognize implement 104 or a specific portion of implement 104 in camera views 122A and 122B. In some embodiments, a special mark may be placed, such as painted or attached, on implement 104. The special mark may be a mark that can easily be detected by processing device 118. As such, processing device 118 can more easily recognize implement 104 from the camera views 122A and 122B by detecting an image of the special mark in at least one of camera views 122A and 122B.

Instead of or in addition to analyzing the camera views 122A and 122B, processing device 118 can also determine the position and/or angle of implement 104 based on data provided by sensor 116. Such data is acquired by sensor 116 as described earlier.

In some embodiments, processing device 118 continuously determines the position and/or angle of implement 104 and updates the position and/or angle of stitching line 126 when it determines that the position and/or angle of implement 104 has changed. In some embodiments, processing device 118 does not continuously determine the position and/or angle of implement 104, but determines the position and/or angle of implement 104 when needed or when appropriate. For example, when imaging system 112 needs to determine the position and/or angle of stitching line 126, processing device 118 may send a retrieving command to sensor 116. Upon receiving the retrieving command, sensor 116 may transmit the position and/or angle of implement 104 to processing device 118. In some embodiments, when sensor 116 detects a change of position and/or angle of implement 104, sensor 116 may send a signal to processing device 118 that triggers processing device 118 to retrieve a new position and/or angle of implement 104 from sensor 116. Processing device 118 may then update the position and/or angle of stitching line 126 according to the new position and/or angle of implement 104. In some embodiments, sensor 116 continuously detects the position and/or angle of implement 104. The detected position and/or angle is stored in a storage medium, such as storage medium 124, installed on machine 100. Processing device 118 may retrieve the position and/or angle of implement 104 from the storage medium when needed.

In some embodiments, updating of the position and/or angle of stitching line 126 may be manually controlled by the operator of machine 100. For example, the operator may enter a command through a human-machine interface installed in main body 102 to instruct processing device 118 to update the position and/or angle of stitching line 126. The human-machine interface may be installed on display device 120.

According to the present disclosure, processing device 118 stitches camera views 122A and 122B to generate the stitched surround view according to the dynamically updated stitching line 126. After that, processing device 118 sends the stitched surround view to display device 120 for presenting to the operator.

Figure 4C:
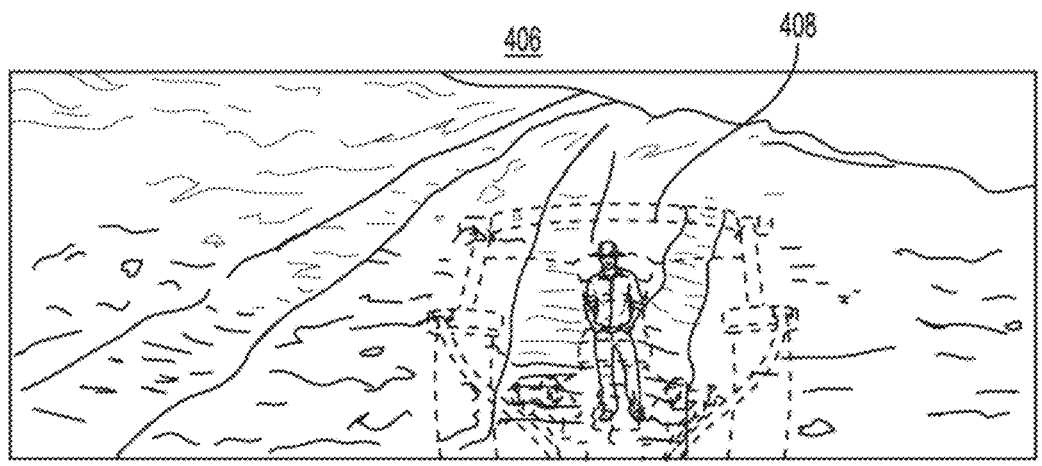

In some embodiments, the operator of machine 100 may wish to know the position of implement 104 while still being able to see the section of the environment behind implement 104. In this situation, as illustrated by a stitched surround view 406 shown in FIG. 4C, processing device 118 may apply a semi-transparent representation 408 of implement 104 to the stitched surround view to indicate where implement 104 is. Semi-transparent representation 408 may be generated in advance and stored in a storage medium, such as storage medium 124, installed on machine 100. When needed, processing device 118 calls semi-transparent representation 408 from the storage medium and applies it to the stitched surround view at the place where implement 104 would be.

Figure 5:
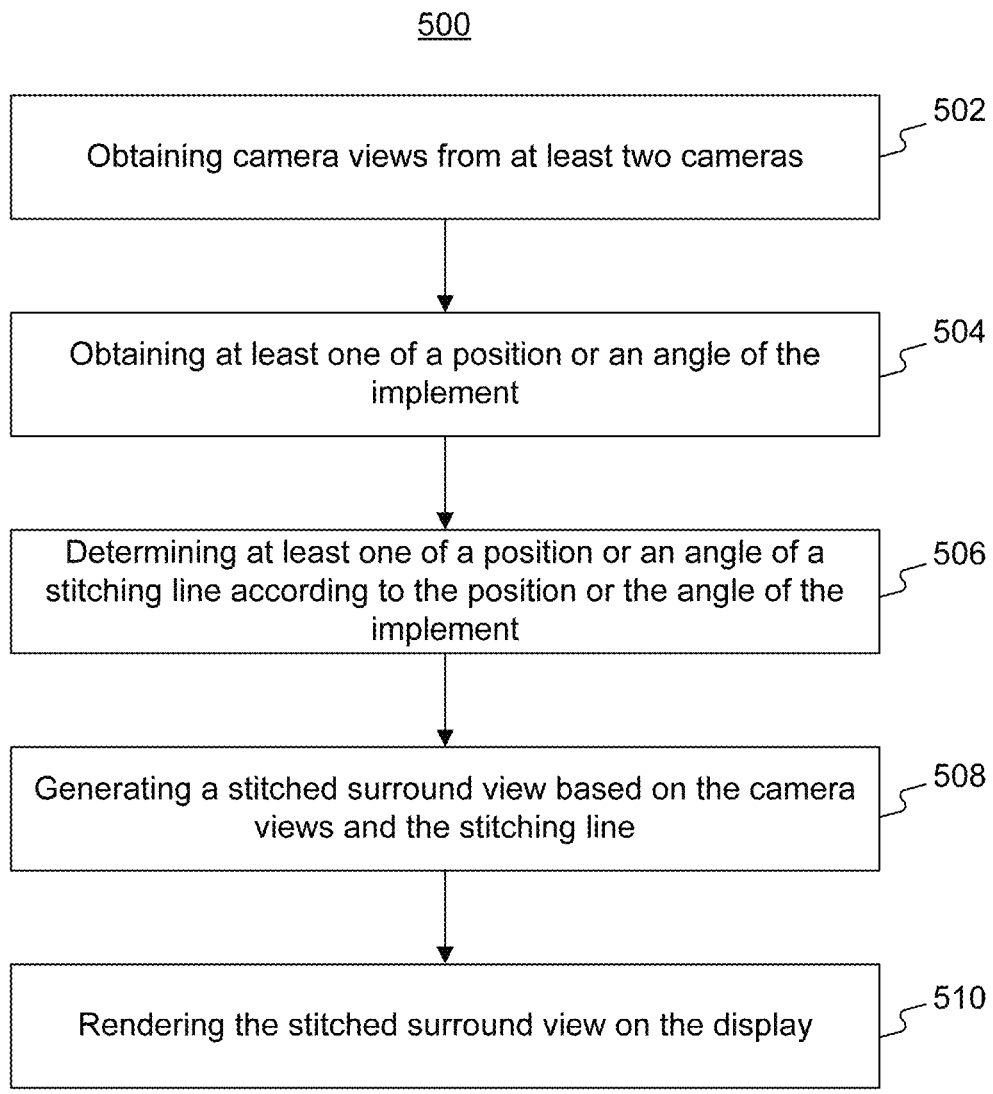
FIG. 5 is a flowchart showing an exemplary method that may be implemented by the system of FIG. 2.

FIG. 5 is a flow chart illustrating an exemplary method 500 for displaying a surround view of the environment around a machine having an implement. Method 500 may be executed by imaging system 112 consistent with embodiments of the present disclosure.

As shown in FIG. 5, at 502, imaging system 112 obtains camera views from cameras 114A and 114B mounted on the machine. Cameras 114A and 114B capture the camera views and send the views to processing device 118 for processing. The obtained camera views have an overlapping portion.

At 504, imaging system 112 obtains at least one of a position or an angle of implement 104. In some embodiments, at least one of the obtained camera views contains an image of implement 104. Imaging system 112 determines the position or the angle of implement 104 by analyzing the image of the implement in the at least one of the obtained camera views. Alternatively, information about the position or the angle of implement 104 may be provided by sensor 116.

At 506, imaging system 112 determines at least one of a position or an angle of stitching line 126 according to the position or the angle of implement 104. In some embodiments, imaging system 112 positions stitching line 126 so that stitching line 126 coincides with implement 104. That is, the position or the angle of stitching line 126 is about the same as the position or the angle of implement 104.

At 508, imaging system 112 generates a stitched surround view based on the camera views and stitching line 126. Specifically, imaging system 112 stitches the camera views at stitching line 126 to generate the stitched surround view.

At 510, imaging system 112 renders the stitched surround view on display device 120. In some embodiments, in addition to the stitched surround view, imaging system 112 may also simultaneously render the camera views on display device 120.

Although FIG. 5 shows the above processes in a particular order, one skilled in the art will appreciate that this does not constitute a requirement that the processes consistent with the present disclosure are performed in such an order. For example, obtaining one of the position or the angle of the implement (504 in FIG. 5) can be performed before or after obtaining the camera views from the at least two cameras (502 in FIG. 5).

INDUSTRIAL APPLICABILITY

The disclosed imaging system may be applicable to any machine that includes an implement. The disclosed imaging system may enhance operator awareness by avoiding the obstruction of the operator's view by the implement. In particular, the disclosed imaging system may stitch the camera views of different cameras to obtain a broader stitched surround view at a stitching line dynamically determined according to the position and/or angle of the implement.

For example, the disclosed imaging system is applicable to machines having vertically oriented implements that pivot horizontally with respect to cameras that are horizontally arranged, as described above in detail. Moreover, the disclosed imaging system is also applicable to machines having implements that pivot vertically with respect to cameras that are vertically arranged, such as wheel loaders.

It will be apparent to those skilled in the art that various modifications and variations can be made to the disclosed imaging system. Other embodiments will be apparent to those skilled in the art from consideration of the specification and practice of the disclosed imaging system. It is intended that the specification and examples be considered as exemplary only, with a true scope being indicated by the following claims and their equivalents.

What is claimed is:

1. An imaging system for a machine having an implement, comprising:
   at least two cameras mounted on the machine at opposing sides of the implement and configured to generate at least two camera views of an environment of the machine; and
   a processing device in communication with the at least two cameras, the processing device being configured to:
   obtain the at least two camera views;
   obtain at least one of a position or an angle of the implement;
   determine at least one of a position or an angle of a stitching line according to the at least one of the position or the angle of the implement;
   generate a stitched surround view based on the at least two camera views and the stitching line; and
   place a semi-transparent representation of the implement in the stitched surround view according to the at least one of the position or the angle of the implement.

2. The imaging system of claim 1, wherein the processing device is further configured to position the stitching line so that the stitching line coincides with the implement.

3. The imaging system of claim 1, wherein the processing device is further configured to obtain the at least one of the position or the angle of the implement by analyzing the at least two camera views using a pattern recognition technique to recognize at least a portion of the implement.

4. The imaging system of claim 1, wherein the processing device is further configured to obtain the at least one of the position or the angle of the implement by detecting an image of a mark in the at least two camera views, the mark being placed on the implement in advance.

5. The imaging system of claim 1, further including a sensor mounted on the machine and configured to detect the at least one of the position or the angle of the implement, wherein the processing device is further configured to obtain the at least one of the position or the angle of the implement provided by the sensor.

6. The imaging system of claim 1, wherein the processing device is further configured to generate the stitched surround view by:
cutting out a first portion from one of the at least two camera views that is on one side of the stitching line;
cutting out a second portion from another one of the at least two camera views that is on another side of the stitching line; and
joining the first portion and the second portion together to create the stitched surround view.

7. The imaging system of claim 1, wherein the processing device is further configured to generate the stitched surround view by:
cutting out a first portion from one of the at least two camera views, the first portion including a first overlapping region around the stitching line and a first non-overlapping region on one side of the stitching line;
cutting out a second portion from another one of the at least two camera views, the second portion including a second overlapping region around the stitching line and a second non-overlapping region on another side of the stitching line; and
superimposing the first overlapping region and the second overlapping region to join the first portion and the second portion to create the stitched surround view.

8. The imaging system of claim 7, wherein the processing device is further configured to, when superimposing the first overlapping region and the second overlapping region, reducing image intensities in the first overlapping region and the second overlapping region.

9. The imaging system of claim 8, wherein the processing device is further configured to reduce the image intensities in the first overlapping region and the second overlapping region so that a superimposed portion of the stitched surround view has an image intensity that is about the same as an image intensity in other portions of the stitched surround view.

10. A method for displaying an environment around a machine having an implement, comprising:
obtaining at least two camera views from opposing sides of the implement;
obtaining at least one of a position or an angle of the implement by analyzing the at least two camera views by detecting an image of a mark in the at least two camera views, the mark being placed on the implement in advance;
determining at least one of a position or an angle of a stitching line according to the at least one of the position or the angle of the implement; and
generating a stitched surround view based on the at least two camera views and the stitching line.

11. The method of claim 10, wherein determining the at least one of the position or the angle of the stitching line includes dynamically determining the position or the angle of the stitching line so that the stitching line coincides with the implement.

12. The method of claim 10, further including placing a semi-transparent representation of the implement in the stitched surround view according to the at least one of the position or the angle of the implement.

13. The method of claim 10, wherein obtaining at least one of the position or the angle of the implement includes analyzing the at least two camera views using a pattern recognition technique to recognize at least a portion of the implement.

14. The method of claim 10, wherein obtaining the at least one of the position or the angle of the implement includes obtaining the at least one of the position or the angle of the implement from a sensor mounted on the machine.

15. The method of claim 10, wherein generating the stitched surround view includes:
cutting out a first portion from one of the at least two camera views that is on one side of the stitching line;
cutting out a second portion from another one of the at least two camera views that is on another side of the stitching line; and
joining the first portion and the second portion together to create the stitched surround view.

16. The method of claim 10, wherein generating the stitched surround view includes:
cutting out a first portion from one of the at least two camera views, the first portion including a first overlapping region around the stitching line and a first non-overlapping region on one side of the stitching line;
cutting out a second portion from another one of the at least two camera views, the second portion including a second overlapping region around the stitching line and a second non-overlapping region on another side of the stitching line; and
superimposing the first overlapping region and the second overlapping region to join the first portion and the second portion to create the stitched surround view.

17. The method of claim 16, wherein superimposing the first overlapping region and the second overlapping region includes reducing image intensities in the first overlapping region and the second overlapping region.

18. A non-transitory computer-readable storage medium storing instructions that, when executed by a processing device of a machine having an implement, cause the processing device to:
obtain at least two camera views from opposing sides of the implement;
obtain at least one of a position or an angle of the implement by at least analyzing the at least two camera views using a pattern recognition technique to recognize at least a portion of the implement;
determine at least one of a position or an angle of a stitching line according to the at least one of the position or the angle of the implement; and
generate a stitched surround view based on the at least two camera views and the stitching line.

19. The non-transitory computer-readable storage medium of claim 18, wherein the instructions, when executed by a processing device of a machine having an implement, further causes the processing device to:

determine the at least one of the position or the angle of the stitching line by at least dynamically determining the position or the angle of the stitching line so that the stitching line coincides with the implement.

20. The non-transitory computer-readable storage medium of claim 18, wherein the instructions, when executed by a processing device of a machine having an implement, further causes the processing device to:
place a semi-transparent representation of the implement in the stitched surround view according to the at least one of the position or the angle of the implement.

* * * * *